(12) United States Patent
Yoo et al.

(10) Patent No.: US 11,772,621 B2
(45) Date of Patent: Oct. 3, 2023

(54) BRAKE OIL RESERVOIR FOR VEHICLES

(71) Applicant: HYUNDAI MOBIS Co., Ltd., Seoul (KR)

(72) Inventors: Ji Ho Yoo, Yongin-si (KR); Jae Hoon Pi, Yongin-si (KR); Si Woo Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/847,474

(22) Filed: Jun. 23, 2022

(65) Prior Publication Data

US 2022/0410858 A1    Dec. 29, 2022

(30) Foreign Application Priority Data

Jun. 24, 2021    (KR) .................... 10-2021-0082395

(51) Int. Cl.
*B60T 11/22*    (2006.01)
*B60T 11/26*    (2006.01)
*F15B 1/26*    (2006.01)

(52) U.S. Cl.
CPC ............... *B60T 11/22* (2013.01); *B60T 11/26* (2013.01); *F15B 1/26* (2013.01)

(58) Field of Classification Search
CPC ............ B60T 11/26; B60T 11/22; F15B 1/26
See application file for complete search history.

(56) References Cited

U.S. PATENT DOCUMENTS

2008/0256948 A1\* 10/2008 Sato ....................... B60T 11/26
                                                                    60/585

\* cited by examiner

*Primary Examiner* — Kenneth Bomberg
*Assistant Examiner* — Daniel S Collins
(74) *Attorney, Agent, or Firm* — Morgan, Lewis & Bockius LLP

(57) ABSTRACT

According to at least one embodiment, the present disclosure provides a brake oil reservoir for a vehicle comprising: an elongated link unit; a first reservoir tank coupled to a first end of the link unit, and including a float guide having a hollow portion and a float moving in the float guide; and a second reservoir tank coupled to a second end of the link unit, and coupled to be biased to one side with respect to a central axis of the link unit extending in a longitudinal direction.

18 Claims, 7 Drawing Sheets

BRAKE OIL RESERVOIR FOR VEHICLES

CROSS-REFERENCE TO RELATED APPLICATION

This application claims priority to and the benefit of Korean Patent Application No. 10-2021-0082395, filed on Jun. 24, 2021, the disclosure of which is incorporated herein by reference in its entirety.

TECHNICAL FIELD

The present disclosure relates to a brake oil reservoir for a vehicle. More particularly, the present disclosure relates to a brake oil reservoir for a vehicle, which is designed to prevent a brake-oil warning light from being turned on under the condition that the vehicle is decelerated, accelerated, and rotated.

BACKGROUND

The content described in this section merely provides the background information on the present disclosure and does not constitute the prior art.

In general, a brake oil reservoir for a vehicle is configured such that an inlet 123 for replenishing brake oil is formed on an upper end thereof and is sealed by a cap, an outlet for supplying the brake oil to a master cylinder is formed on a lower end thereof, a sensor for sensing the amount of oil in the reservoir and a float for actuating the sensor are installed on a bottom surface thereof.

When the amount of oil of the brake oil reservoir is reduced due to the abrasion of a brake pad or oil leakage, the float positioned in a cylindrical space moves downwards. If the float moves downwards, the sensor senses the oil amount and turns on a brake-oil warning light on an instrument panel on a dash panel so that a driver can easily recognize a reduction in brake oil level. Since the vehicle using the disc brake may determine the abrasion degree of the brake pad depending on the height of the brake oil, the oil amount serves to inform a driver of brake-pad replacement time.

Recently, an electronic brake system which performs various functions to improve the stability of a vehicle and electronically controls a device is used. A vehicle equipped with the electronic brake system additionally requires a component such as an engine as well as devices such as a motor or a converter, and an eco-friendly vehicle additionally requires a component such as a frunk in an engine room, thus making it difficult to package components in a limited space. In order to overcome the difficulty, the reservoir may be designed as a remote type reservoir, but this is problematic in that it is disadvantageous in terms of cost and an assembly process should be added.

Furthermore, in the case of a conventional brake oil reservoir, a phenomenon in which brake oil leans to one side occurs under the condition that the vehicle is decelerated, accelerated and rotated. When the brake oil leans to one side, the float in the reservoir moves downwards, and consequently, the brake-oil warning light on the instrument panel on the dash panel may be undesirably turned on even though the brake oil is not insufficient.

SUMMARY

According to at least one embodiment, the present disclosure provides a brake oil reservoir for a vehicle comprising: an elongated link unit; a first reservoir tank coupled to a first end of the link unit, and including a float guide having a hollow portion and a float moving in the float guide; and a second reservoir tank coupled to a second end of the link unit, and coupled to be biased to one side with respect to a central axis of the link unit extending in a longitudinal direction.

DETAILED DESCRIPTION

Figure 1:
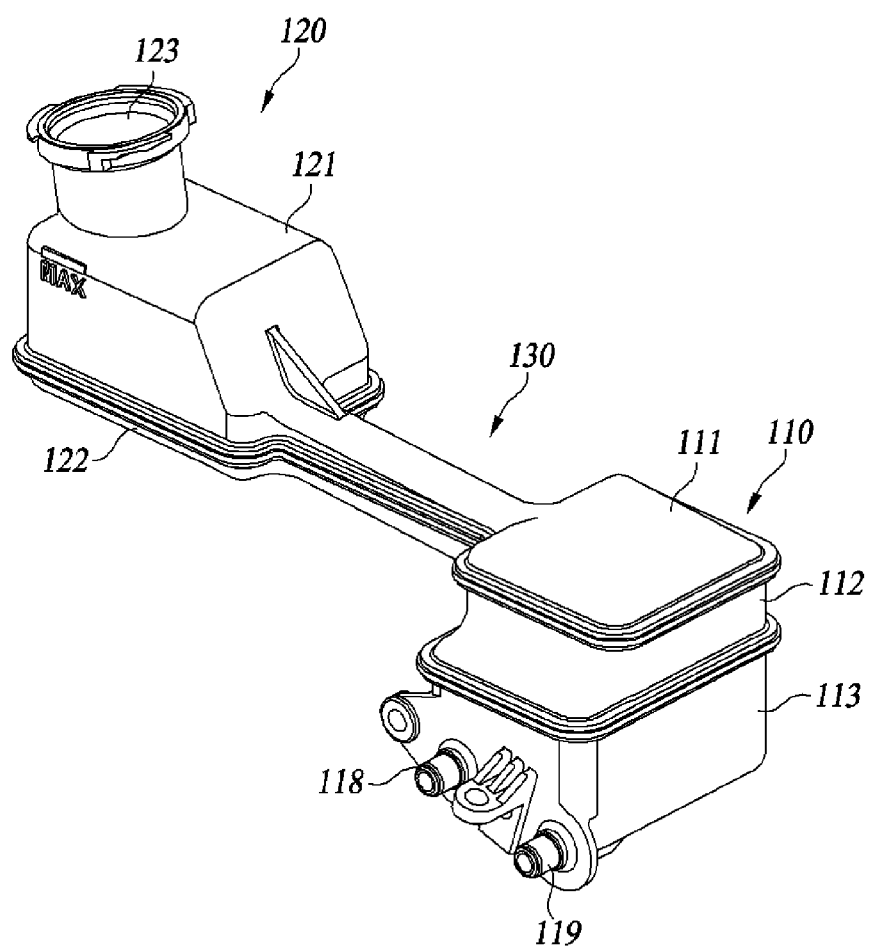
FIG. 1 is a perspective view illustrating a brake oil reservoir for a vehicle according to an embodiment of the present disclosure.

In view of the above, the present disclosure provides a brake oil reservoir for a vehicle, in which a reservoir having two or more tanks is designed in an integral structure, so that the layout of the reservoir can be simply made.

A brake oil reservoir for a vehicle according to an embodiment can reduce a phenomenon in which brake oil leans to one side using an internal design.

The problems to be solved by the present disclosure are not limited to the above-mentioned problems, and other problems which are not mentioned will be clearly understood by those skilled in the art from the following description.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

FIG. 1 is a diagram illustrating the configuration of a brake oil reservoir for a vehicle according to an embodiment of the present disclosure.

Referring to FIG. 1, the brake oil reservoir 100 for the vehicle according to an embodiment of the present disclosure may include all or some of a first reservoir tank 110, a second reservoir tank 120, and a link unit 130. One end of the link unit 130 is connected to the first reservoir tank 110, while the other end of the link unit 130 is connected to the second reservoir tank 120. The second reservoir tank 120 is designed to be biased to one side with respect to the central axis in the longitudinal direction of the link unit 130.

Figure 2:
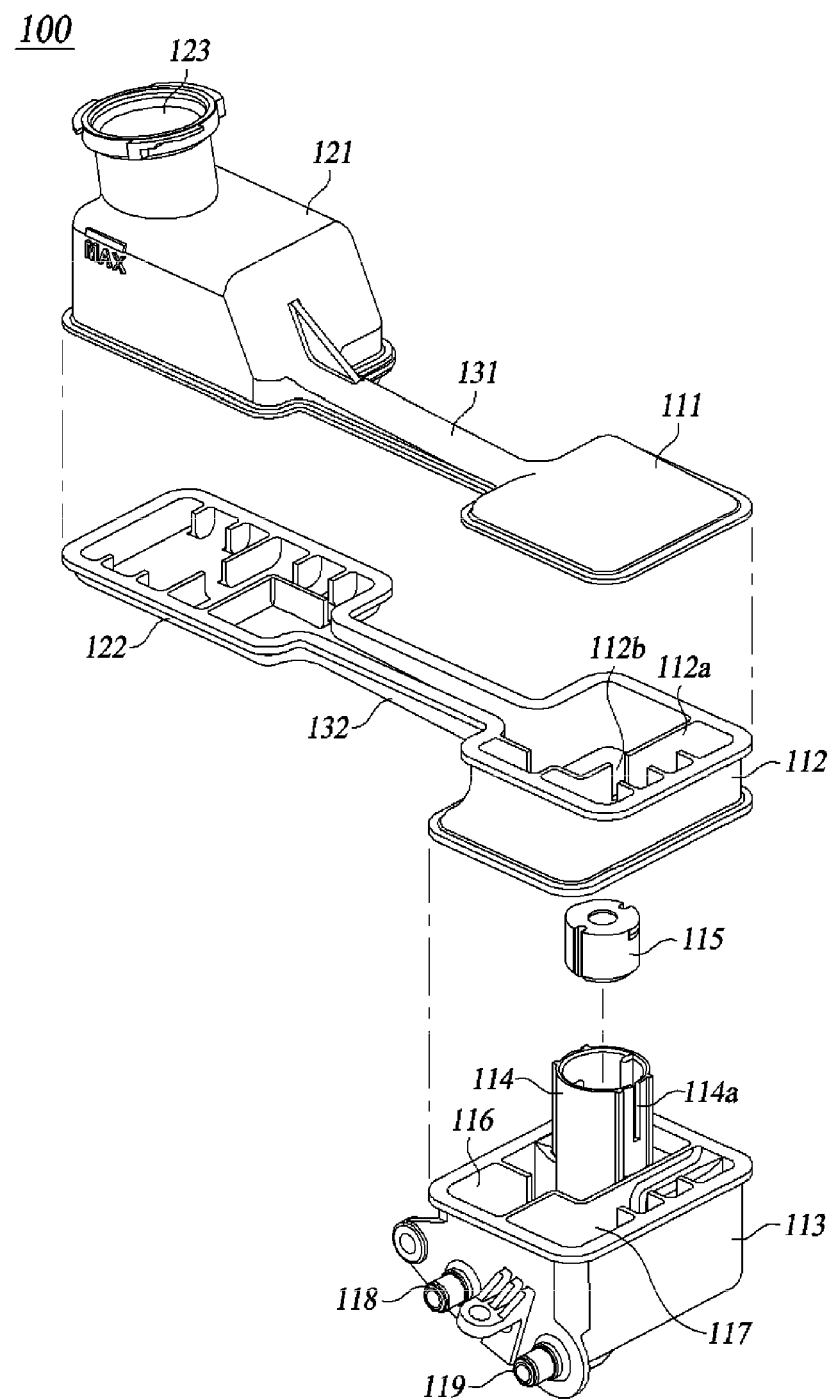
FIG. 2 is an exploded view illustrating the brake oil reservoir for the vehicle according to an embodiment of the present disclosure.

FIG. 2 is an exploded view illustrating the brake oil reservoir for the vehicle according to an embodiment of the present disclosure.

Figure 3:
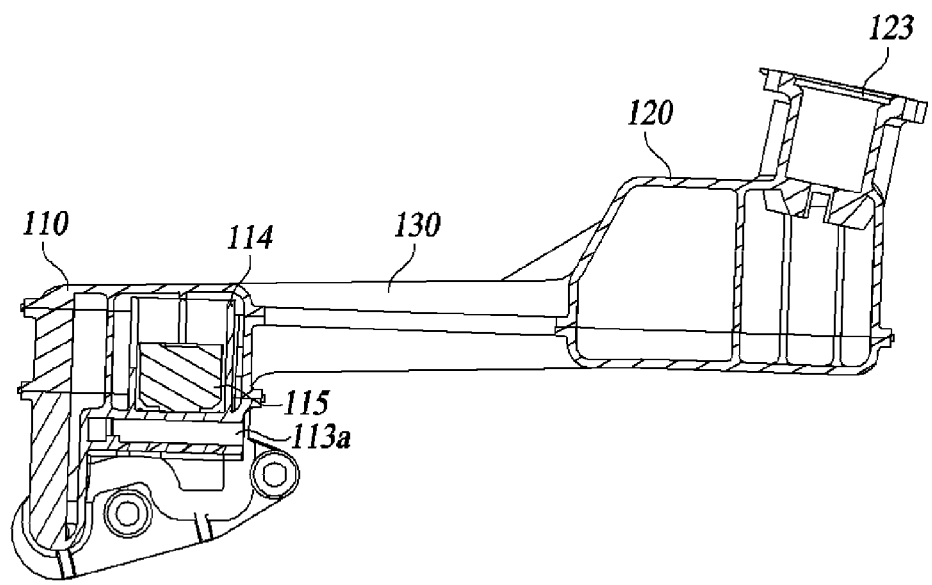
FIG. 3 is a vertical sectional view illustrating the brake oil reservoir for the vehicle according to an embodiment of the present disclosure.

FIG. 3 is a vertical sectional view illustrating the brake oil reservoir for the vehicle according to an embodiment of the present disclosure.

Referring to FIGS. 2 and 3, the first reservoir tank 110 of the brake oil reservoir 100 for the vehicle according to an embodiment of the present disclosure may include a first upper body 111, a first central body 112, and a first lower body 113. The second reservoir tank 120 may include a second upper body 121 and a second lower body 122. The link unit 130 may include an upper link unit 131 and a lower link unit 132. The first upper body 111, the upper link unit 131, and the second upper body 121 are integrated with each other, and will be defined below as an 'upper reservoir part'. The first central body 112, the lower link unit 132, and the second lower body 122 are integrated with each other, and will be described below as a 'central reservoir part'. The upper reservoir part and the central reservoir part are welded to each other, and the first central body 112 of the central reservoir part and the first lower body 113 are also welded to each other. Consequently, the brake oil reservoir 100 for the vehicle according to an embodiment of the present disclosure may have an integrated structure.

The first reservoir tank 110 of the brake oil reservoir 100 for the vehicle according to an embodiment of the present disclosure may include a float guide 114, a float 115, and a sensor housing 113a. The float guide 114 is injection molded from the first lower body 113 in a direction perpendicular to the underside of the first lower body 113. The float guide 114 may have a hollow portion therein, and have a cylindrical shape. The float 115 is positioned in the hollow portion defined in the float guide 114. The float 115 may move up and down in the hollow portion of the float guide 114 with the displacement of a brake oil surface.

The sensor housing 113a may be formed on an outer surface of the first lower body 113 to face the float guide 114. A detection sensor (not shown) may be inserted into the sensor housing 113a. When the amount of the brake oil in the brake oil reservoir 100 decreases because of the abrasion of the brake pad or oil leakage, the displacement level of the brake oil surface in the brake oil reservoir 100 is lowered. When the displacement level of the brake oil surface is lowered, the displacement level of the float 115 floating on the brake oil surface is also lowered along the float guide 114. In the case that the float 115 moves downwards, the detection sensor positioned in the sensor housing 113a detects the downward movement, and the detection sensor turns on a brake-oil warning light on an instrument panel on a dash panel so that a driver can easily recognize a reduction in brake oil level. In the case that the brake oil in the brake oil reservoir 100 is insufficient, the float 115 should be designed not to float on the brake oil surface so as to turn on the warning light. Since the weight of the float 115 should be greater than buoyancy caused by the brake oil, the float should be designed such that $mg > \rho Vg$ is satisfied. Here, m refers to the mass of the float 115, g refers to a gravitational constant, $\rho$ refers to the density of the brake oil, and V refers to a partial volume in which the float 115 is submerged in the brake oil.

Depending on the displacement of the brake oil in the brake oil reservoir 100, the displacement of the brake oil in the float guide 114 should be also changed. Therefore, the lower end of the float guide 114 is coupled to or integrated with the first lower body 113, while the upper end of the float guide 114 is not welded to the first upper body 111. Further, the float guide 114 has on a side thereof a slit 114a extending in a longitudinal direction of the float guide 114. The slit 114a is positioned to be parallel to the longitudinal direction of the link unit 130, and is positioned in a direction opposite to the link unit 130.

The first reservoir tank 110 of the brake oil reservoir 100 for the vehicle according to an embodiment of the present disclosure may include all or some of a bulkhead 112a, a first chamber 116, a second chamber 117, a first outlet 118, and a second outlet 119. The bulkhead 112a serves to divide the internal space of the first reservoir tank 110 into two spaces. Among the two spaces, a space which is directly connected to the link unit 130 is referred to as the first chamber 116, and a space which is connected to the first chamber 116 is referred to as the second chamber 117. An outlet connected to the first chamber 116 is referred to as a first outlet 118, and an outlet connected to the second chamber 117 is referred to as a second outlet 119. The first outlet 118 and the second outlet 119 are connected to a master cylinder (not shown) of the brake for the vehicle.

The master cylinder serves to generate braking force by supplying the brake oil to a wheel cylinder of a wheel according to the effort force of a brake pedal. The bulkhead 112a for separating the space of the first chamber 116 from the space of the second chamber 117 may include a slot 112b, and the brake oil may move through the slot between the first chamber 116 and the second chamber 117. As the bulkhead 112a divides the space of the first reservoir tank 110, it is possible to prevent all the brake oil from leaking from the brake oil reservoir 100 even if a problem occurs in either of the first outlet 118 or the second outlet 119.

Figure 4:
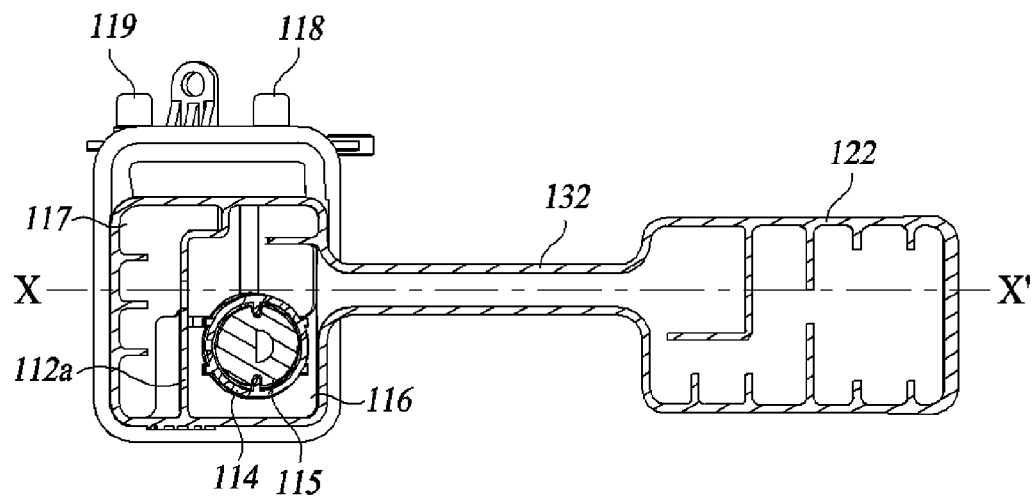
FIG. 4 is a horizontal sectional view illustrating the brake oil reservoir for the vehicle according to an embodiment of the present disclosure.

FIG. 4 is a horizontal sectional view illustrating the brake oil reservoir for the vehicle according to an embodiment of the present disclosure.

The brake oil reservoir 100 for the vehicle according to an embodiment of the present disclosure designs the link unit 130 to be thin, thus reducing the amount of consumed brake oil by ⅔, compared to a conventional integral brake oil reservoir, and improving packaging performance. In order to improve the packaging performance, it is possible to design the reservoir as a remote type reservoir. However, the remote type reservoir is problematic in that it is disadvantageous in terms of cost and an additional assembly process is required. Therefore, the present disclosure can employ the integral reservoir instead of using the remote type reservoir by designing the brake oil reservoir 100 as shown in FIG. 4.

The brake oil reservoir 100 for the vehicle according to an embodiment of the present disclosure can prevent the brake-oil warning light from being turned on under rotation conditions by using the design of the first reservoir tank 110 and the second reservoir tank 120. One end of the link unit 130 is connected to the first reservoir tank 110, while the other end of the link unit 130 is connected to the second reservoir tank 120. The second reservoir tank 120 is designed to be biased to one side with respect to the central axis in the longitudinal direction of the link unit 130. The float guide 114 of the first reservoir tank 110 is also positioned in the same direction as the second reservoir tank 120 with respect to the central axis in the longitudinal direction of the link unit 130.

Referring to FIG. 4, line X-X' is a straight line indicating the central axis in the longitudinal direction of the link unit 130. The brake oil reservoir 100 is installed such that the second reservoir tank 120 faces the front of the vehicle. Based on the front of the vehicle, the second reservoir tank 120 is designed to be biased to the right compared to the central axis in the longitudinal direction of the link unit 130. Further, the float guide 115 is positioned on the right side compared to the central axis in the longitudinal direction of the link unit. When the vehicle is decelerated, accelerated or rotated, a phenomenon where the brake oil leans to one side in the brake oil reservoir 100 occurs. The principle of preventing the brake-oil warning light from being turned on even if the brake oil leans to one side in the brake oil reservoir 100 using the design of the brake oil reservoir 100 will be described below in detail.

Figure 5A:
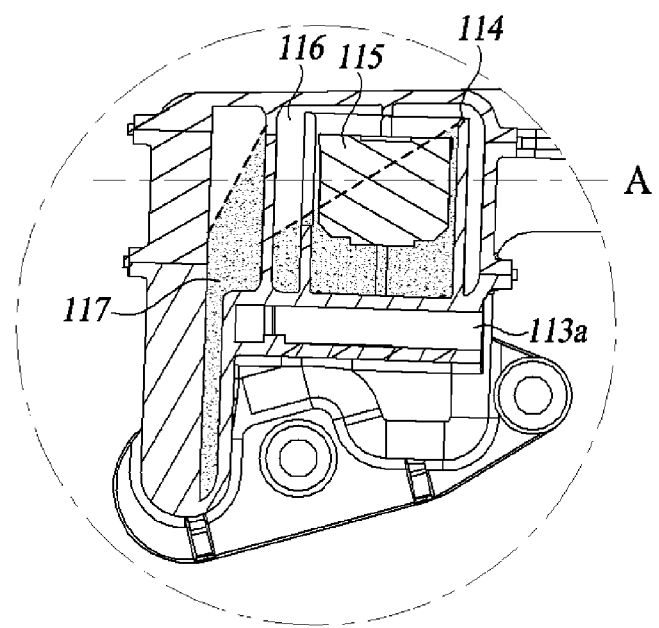
FIGS. 5A and 5B are diagrams illustrating a phenomenon in which brake oil in a first reservoir tank leans to one side when the vehicle is decelerated, according to an embodiment of the present disclosure.
Figure 5B:
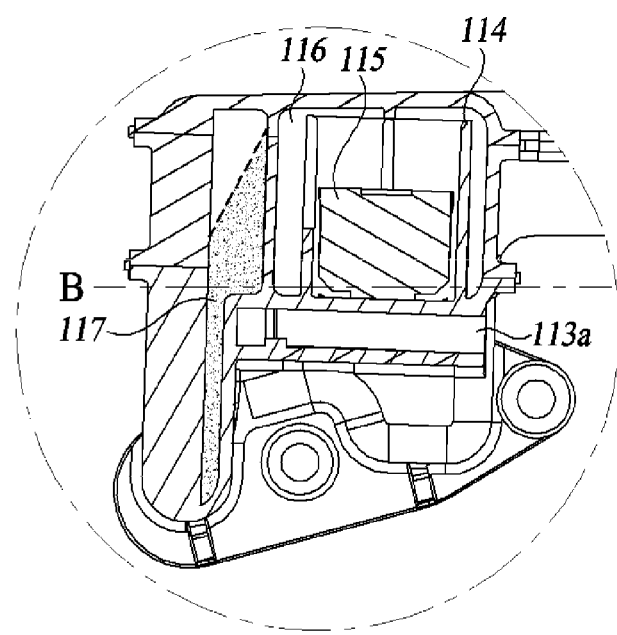

FIGS. 5A and 5B are diagrams illustrating a phenomenon in which the brake oil in the first reservoir tank leans to one side when the vehicle is decelerated, according to an embodiment of the present disclosure.

The brake oil reservoir 100 for the vehicle according to an embodiment of the present disclosure is disposed in an engine room such that the second reservoir tank 120 faces the front of the vehicle and the first reservoir tank 110 faces the rear of the vehicle. When the vehicle is accelerated or decelerated, a phenomenon in which the brake oil leans to one side in the brake oil reservoir 100 occurs due to inertia. When the vehicle is accelerated, the brake oil momentarily leans to the rear, so that the amount of the brake oil in the first reservoir tank 110 is relatively large. If the amount of the brake oil in the first reservoir tank 110 increases, the amount of the brake oil in the float guide 114 also increases, so that the float 115 moves upwards and thereby the brake-oil warning light may not be turned on.

In contrast, when the vehicle is decelerated, the brake oil momentarily leans to the front. When the brake oil leans to the second reservoir tank 120 and thus the amount of the brake oil in the first reservoir tank 110 is insufficient, the amount of the brake oil in the float guide 114 is also reduced, so that the float 115 moves downwards and the brake-oil warning light is turned on. Thus, according to this embodiment, a phenomenon in which the brake oil leans from the first reservoir tank 110 to the second reservoir tank 120 may be delayed using the elongated link unit 130. Furthermore, a plurality of bent inner walls may be formed in the first reservoir tank 110 and the second reservoir tank 120 to delay a phenomenon in which the brake oil lean to one side.

FIG. 5A illustrates a state in which a predetermined level of brake oil is present in the float guide 114 even if the vehicle is decelerated and the brake oil leans to the front (the right side of FIG. 5) of the brake oil reservoir 100, according to an embodiment of the present disclosure. The brake oil is present in the float guide 114 by using the bulkhead 112a, the float guide 114, and the slit 114a even when the vehicle is decelerated, and the float 115 also does not move downwards, so that the brake-oil warning light is not turned on. Line A is a straight line indicating an approximate height of the float 115 when the vehicle is decelerated, according to an embodiment of the present disclosure.

On the other hand, FIG. 5B shows a case where there is a plurality of holes with or without the float guide 114. When the float guide 114 is absent or a plurality of holes are present, the brake oil in the first chamber 116 moves downwards due to the leaning phenomenon of the brake oil when the vehicle is decelerated. As a result, the float 115 also moves downwards and the detection sensor is operated, thus turning on the brake-oil warning light. Line B is a straight line indicating an approximate height of the float 115 when the vehicle is decelerated, in the case that the float guide 114 is absent or the plurality of holes are present.

Figure 6A:
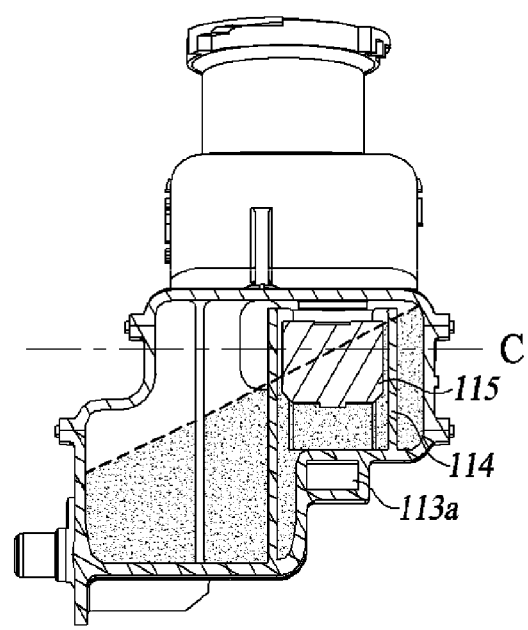
FIGS. 6A and 6B are diagrams illustrating a phenomenon in which the brake oil in the first reservoir tank leans to one side when the vehicle is rotated, according to an embodiment of the present disclosure.
Figure 6B:
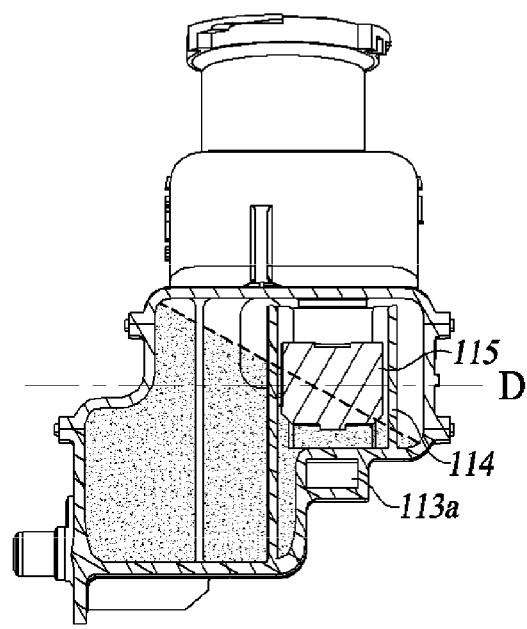

FIGS. 6A and 6B are diagrams illustrating a phenomenon in which the brake oil in the first reservoir tank leans to one side when the vehicle is rotated, according to an embodiment of the present disclosure.

FIG. 6A is a diagram illustrating a phenomenon in which the brake oil in the first reservoir tank 110 leans to one side when the vehicle is turned leftwards. Referring to FIG. 6A, when the vehicle is turned leftwards, the brake oil leans to the right (the right side of FIG. 6) due to inertia. The brake oil reservoir 100 according to an embodiment of the present disclosure is designed such that the float guide 114 and the float 115 are positioned on the right. Consequently, when there occurs a phenomenon in which the brake oil leans to the right as the vehicle rotates leftwards, the amount of the brake oil in the float guide 114 is increased. As the amount of the brake oil in the float guide 114 increases, the float 115 moves upwards and the brake-oil warning light is not turned on. Line C is a straight line indicating an approximate height of the float 115 when the vehicle is turned leftwards, according to an embodiment of the present disclosure.

FIG. 6B is a diagram illustrating a phenomenon in which the brake oil in the first reservoir tank 110 leans to one side when the vehicle is turned rightwards. Referring to FIG. 6B, when the vehicle is turned rightwards, the brake oil leans to the left (the left side of FIG. 6) due to inertia. The brake oil reservoir 100 according to an embodiment of the present disclosure is designed such that the float guide 114 and the float 115 are positioned on the right. However, referring to FIG. 4, the second reservoir tank 120 is designed to be biased to the right with respect to the central axis in the longitudinal direction of the link unit 130. As the left and right sides are asymmetrically designed, the moving amount of the brake oil when the brake oil leans to the left is smaller than the moving amount when the brake oil leans to the right. As a result, even when a phenomenon in which the brake oil leans to the left occurs as the vehicle is turned rightwards, the amount of the brake oil leaning to the left in the second reservoir tank 120 is small. In other words, even if the float 115 is slightly moved downwards as the amount of the brake oil in the float guide 114 is reduced, the brake-oil warning light is not turned on. Line D is a straight line indicating an approximate height of the float 115 when the vehicle is turned rightwards, according to an embodiment of the present disclosure.

According to an embodiment, a brake oil reservoir for a vehicle is advantageous in that a reservoir having two or more tanks is designed in an integral structure, so that it is possible to minimize the volume and weight of a brake system, reduce cost, and simplify an assembly process.

According to an embodiment, a brake oil reservoir for a vehicle is advantageous in that it is possible to reduce a phenomenon in which brake oil leans to one side, thus preventing a brake-oil warning light on an instrument panel on a dash panel from being turned on even when brake oil is not insufficient.

Although exemplary embodiments of the present disclosure have been described for illustrative purposes, those skilled in the art will appreciate that various modifications, additions, and substitutions are possible, without departing from the idea and scope of the present disclosure. Therefore, exemplary embodiments of the present disclosure have been described for the sake of brevity and clarity. The scope of the technical idea of the present embodiments is not limited by the illustrations. Accordingly, one of ordinary skill would understand the scope of the present disclosure is not to be limited by the above explicitly described embodiments but by the claims and equivalents thereof.

What is claimed is:

1. A brake oil reservoir for a vehicle comprising:
   an elongated link unit;
   a first reservoir tank coupled to a first end of the link unit, and including a float guide having a hollow portion and a float moving in the float guide in a first direction; and
   a second reservoir tank having an inlet for replenishing brake oil at one end and coupled to a second end of the link unit at the other end, the second reservoir tank being coupled to be biased to one side, in a plan view orthogonal to the first direction, with respect to a central axis of the link unit extending in a longitudinal direction.

2. The brake oil reservoir of claim 1, wherein the float guide is positioned to be biased in the same direction as a direction in which the second reservoir tank is biased with respect to the central axis of the link unit.

3. The brake oil reservoir of claim 1, wherein the link unit, the first reservoir tank, and the second reservoir tank are integrated with each other.

4. A brake oil reservoir for a vehicle comprising:
   an elongated link unit;
   a first reservoir tank coupled to a first end of the link unit, and including a float guide having a hollow portion and a float moving in the float guide; and
   a second reservoir tank coupled to a second end of the link unit, and coupled to be biased to one side with respect to a central axis of the link unit extending in a longitudinal direction,
   wherein the first reservoir tank comprises a first upper body, a first central body, and a first lower body.

5. The brake oil reservoir of claim 4, wherein the first upper body, the first central body, and the first lower body are welded to each other.

6. The brake oil reservoir of claim 4, wherein the float guide has a cylindrical shape, and is injection molded from the first lower body in a direction perpendicular to the first lower body.

7. The brake oil reservoir of claim 4, wherein the float guide and the first lower body are integrated with each other.

8. The brake oil reservoir of claim 4, wherein the float guide is not welded to the first upper body.

9. The brake oil reservoir of claim 1, wherein the float guide has on a side thereof a slit extending in a longitudinal direction of the float guide, and
   the slit is positioned to be vertical to the longitudinal direction of the link unit, and is positioned in a direction opposite to the link unit.

10. The brake oil reservoir of claim 1, wherein the first reservoir tank comprises a bulkhead formed to be perpendicular to the longitudinal direction of the link unit.

11. The brake oil reservoir of claim 10, wherein the first reservoir tank comprises a first chamber connected to the link unit with respect to the bulkhead, and a second chamber connected to the first chamber.

12. The brake oil reservoir of claim 10, wherein the bulkhead comprises a rectangular slot that is configured to move brake oil in the first reservoir tank.

13. The brake oil reservoir of claim 1, wherein each of the first reservoir tank and the second reservoir tank comprises a plurality of inner walls.

14. The brake oil reservoir of claim 1, wherein the second reservoir tank comprises a second upper body and a second lower body.

15. The brake oil reservoir of claim 14, wherein the second upper body and the second lower body are welded to each other.

16. A brake oil reservoir for a vehicle comprising:
    an elongated link unit;
    a first reservoir tank coupled to a first end of the link unit, and including a float guide having a hollow portion and a float moving in the float guide; and
    a second reservoir tank coupled to a second end of the link unit, and coupled to be biased to one side with respect to a central axis of the link unit extending in a longitudinal direction,
    wherein the first reservoir tank comprises a sensor housing on an outer surface of a lower end of the float guide.

17. The brake oil reservoir of claim 1, wherein the first reservoir tank comprises a plurality of outlets configured to discharge brake oil.

18. The brake oil reservoir of claim 1, wherein the second reservoir tank comprises an inlet configured to replenish brake oil.

* * * * *